(12) United States Patent
Christ et al.

(10) Patent No.: US 8,580,171 B2
(45) Date of Patent: Nov. 12, 2013

(54) PROCESS FOR MANUFACTURE OF A LATENT HEAT STORAGE DEVICE

(75) Inventors: Martin U. Christ, Augsburg (DE);
Oswin H. Ottinger, Meitingen (DE);
Jurgen J. Bacher, Wertingen (DE);
Bastian Hudler, Rain (DE)

(73) Assignee: SGL Carbon AG, Rheingaustrasse (DE)

( * ) Notice: Subject to any disclaimer, the term of this patent is extended or adjusted under 35 U.S.C. 154(b) by 1320 days.

(21) Appl. No.: 11/388,896

(22) Filed: Mar. 24, 2006

(65) Prior Publication Data

US 2007/0222112 A1    Sep. 27, 2007

(51) Int. Cl.
*B29C 43/02* (2006.01)
*B29C 67/02* (2006.01)

(52) U.S. Cl.
USPC ........... 264/128; 264/122; 264/140; 264/160; 264/320

(58) Field of Classification Search
None
See application file for complete search history.

(56) References Cited

U.S. PATENT DOCUMENTS

| | | | | |
|---|---|---|---|---|
| 3,404,061 A | * | 10/1968 | Bochman et al. | 428/143 |
| 3,527,856 A | * | 9/1970 | Olstowski | 264/109 |
| 3,560,155 A | * | 2/1971 | Olstowski | 423/448 |
| 3,573,122 A | * | 3/1971 | Olstowski et al. | 264/29.1 |
| 3,961,010 A | * | 6/1976 | Holmes | 264/221 |
| 4,226,821 A | * | 10/1980 | Ishikawa et al. | 264/134 |
| 4,895,713 A | | 1/1990 | Greinke et al. | |
| 6,180,038 B1 | * | 1/2001 | Cesaroni | 264/135 |
| 6,645,456 B2 | | 11/2003 | Ottinger et al. | |
| 6,660,198 B1 | * | 12/2003 | Fischer | 264/138 |
| 2002/0016505 A1 | | 2/2002 | Gally et al. | |
| 2002/0033247 A1 | | 3/2002 | Neuschutz et al. | |
| 2002/0060063 A1 | * | 5/2002 | Neuschutz et al. | 165/61 |
| 2004/0084658 A1 | * | 5/2004 | Ottinger et al. | 252/500 |
| 2005/0007740 A1 | | 1/2005 | Neuschuetz et al. | |
| 2005/0258394 A1 | | 11/2005 | Bacher et al. | |
| 2008/0258394 A1 | * | 10/2008 | Allingham | 273/407 |

FOREIGN PATENT DOCUMENTS

| | | |
|---|---|---|
| DE | 100 36 777 A1 | 2/2002 |
| EP | 0 914 399 B1 | 11/2000 |
| EP | 1 371 915 A2 | 12/2003 |
| EP | 1 455 156 A2 | 9/2004 |
| WO | WO-03/102484 A2 | 12/2003 |

* cited by examiner

*Primary Examiner* — Edmund H. Lee
(74) *Attorney, Agent, or Firm* — Taylor IP, P.C.

(57) ABSTRACT

A process for the preparation of latent heat storage composites is provided. The process comprises the steps of preparation of an expanded graphite material with a bulk density between 5 and 200 grams/liter which is readily wetted by a liquid phase change material, preparation of a pre-compressed matrix or a packed bed of the expanded graphite material, and manufacture of a latent heat storage composite by infiltration of the matrix or a packed bed with a phase change material in a liquid state.

31 Claims, 2 Drawing Sheets

PROCESS FOR MANUFACTURE OF A LATENT HEAT STORAGE DEVICE

FIELD OF THE INVENTION

The present invention relates to a process for the preparation of latent heat storage composites by infiltration of a phase change material into a matrix or a packed bed containing expanded graphite material, to a process for the manufacture of latent heat storage devices utilizing the latent heat storage composite prepared according to the invention, and processes for using the latent heat storage composites in latent heat storage devices.

BACKGROUND OF THE INVENTION

Phase change materials (PCM) are capable of storing heat energy in the form of latent heat. Such materials undergo a phase transition when heat is supplied or removed, e.g., a transition from the solid to the liquid phase (melting) or from the liquid to the solid phase (solidification) or a transition between a low-temperature and high-temperature modification or a hydrated and a de-hydrated modification or between different liquid modifications. If heat is supplied to or removed from a phase change material, on reaching the phase transition point, the temperature remains constant until the material is completely transformed. The heat supplied or released during the phase transition, which causes no temperature change in the material, is known as latent heat.

Unfortunately, the heat conductivity of most phase change materials is rather low. As a consequence, the charging and discharging of a latent heat storage device is a relatively slow process. This problem can be overcome by providing a latent heat storage composite wherein the phase change material is combined with an auxiliary component with high thermal conductivity, e.g., graphite.

Granted European Patent No. EP 0914399 B1 discloses a composite for storage of latent heat and the process of manufacturing such a composite. The composite consists of an inert graphite matrix with a bulk density of more than 75 grams per liter (g/l) which has been infiltrated under vacuum with a solid/liquid phase change material (PCM). The graphite matrix has a high porosity and allows a high PCM loading of up to at most 90% by volume without being destroyed by the change in volume occurring during the phase transition. A high PCM loading in the composite is needed to achieve a high energy density.

One advantage of this composite is the use of graphite as matrix material, which by its nature has a high thermal conductivity and, since it is substantially chemically inert, imposes scarcely any restrictions on the choice of the PCM.

The graphite matrix is made by compressing expanded graphite material to a density between 75 and 1500 g/l, preferably between 75 and 300 g/l. The storage composite is obtained by vacuum infiltration of the PCM into the preformed matrix. The matrix is made by compressing expanded graphite material with a bulk density of two grams per liter into the shape of a cylinder with a diameter of 42 mm and a height of 10 mm. Prior to the infiltration, the matrix is evacuated to a pressure of 10 mbar or below, and the PCM is heated to a temperature which is preferably between 10 and 40 Kelvin (K) above the melting point, but at most up to the evaporation temperature of the PCM. As a result of a valve leading to the PCM vessel being opened, the molten PCM, which is present in excess, is sucked into the graphite matrix. Then, the storage composite is preferably cooled to below room temperature, in order to reduce the escape of PCM gases until the storage container is closed.

An alternative process for vacuum infiltration of a matrix made by compression of expanded graphite material was disclosed in published U.S. Publication No. 2002-060063. The process comprises the steps of partially or completely immersing the matrix, which is fixed inside an infiltration vessel, under atmospheric pressure in a molten phase change material, and evacuation of the infiltration vessel until the desired degree of loading of the matrix with the PCM has been achieved.

The vacuum infiltration process can be continued until the residual porosity of the composite is approximately 5% by volume. This residual porosity can be reached after an infiltration period of up to approximately five days, preferably of approximately up to four days. The graphite matrix expediently has a density of about 75 to about 1500 g/l, preferably about 75 to about 300 g/l, particularly preferably approximately of about 200 g/l.

There are several phase change materials, especially hydrophilic ones, which do not readily infiltrate into a porous matrix formed by compression of expanded graphite material because of a rather high interfacial energy between the phase change material and the graphite material of the matrix. When the interfacial energy between both PCM and graphite matrix is high, the matrix is not or only scarcely wetted by the PCM.

Due to a phenomenon known as negative capillary effect, this problem tends to be more severe the smaller the radii of the pores are. The low PCM loading of a matrix with small pores results in a low energy density of the storage composite, and therefore a low efficiency.

Another drawback of the prior art is the need to carry out the infiltration under vacuum which makes the equipment for the infiltration rather complicated and expensive.

Another type of latent heat storage composite is disclosed in U.S. Publication No. 2005-258394. Within this composite, flakes of natural graphite or/and synthetic graphite having a high anisotropy of thermal conductivity and a high aspect ratio form the auxiliary heat conducting component.

Such a composite is obtained, for example, by infiltration of the liquid phase change material into a bed containing graphite flakes as a bulk good. Infiltration can be supported by vacuum or pressure, but this is not necessary.

In contrast, preparation of an analogous composite by infiltration of the phase change material into a bed containing expanded graphite material as bulk good is rarely possible. Due to the high interface energy between the expanded graphite material and the PCM, it is extremely difficult to infiltrate expanded graphite material as bulk good with a liquid PCM without foaming and floating of the expanded particles. Therefore, there is a need to improve the wettability of the expanded graphite particles by the PCM to facilitate infiltration.

SUMMARY OF THE INVENTION

In one embodiment, the invention relates to a process for the preparation of a latent heat storage composite by infiltration of a phase change material into a matrix or packed bed of expanded graphite material wherein the interfacial energy between the expanded graphite material and the phase change material is reduced, resulting in a more readily wetting of the expanded graphite material by the phase change material. In another embodiment, of the invention, a process is provided for the manufacture of a latent heat storage device utilizing the latent heat storage composite prepared according to the invention.

In one embodiment, the degree of expansion of the graphite during the expansion process is controlled. More specifically, in one embodiment, the expansion process is controlled in such way that the bulk density of the expanded graphite material is not lower than 5 g/l and not higher than 200 g/l. It is believed that keeping the bulk density of the expanded graphite material within this range results in a less rugged surface of the expanded particles and a significant reduction of the amount of small pores, which are not readily infiltrated due to a negative capillary effect.

To keep the bulk density of the expanded graphite material within the desired limits, prior to or during the expansion of the graphite at least one of the following means or combinations of at least two of the following means can be used 1) limitation of the particle size of the starting graphite material to 50 mesh or below;

2) appropriate adjustment of the mass ratio between the starting graphite material and the intercalating agent(s) applied in the intercalation process; and 3) reduction of the temperature of the expansion to at most 750° C. and preferably 500° C. or less.

Application of one or a combination of these means results in a limitation of the degree of expansion (ratio between the volume of the expanded graphite material and the volume of the starting material).

It should be noted that such means which reduce the degree of expansion of the graphite are contrary to the expansion procedures described, for example, in U.S. Pat. Nos. 3,404,061; 4,895,713; or 6,645,456. These and other prior art documents disclose expansion procedures which provide expanded graphite material suitable for the production of graphite foil. Throughout these prior art processes, a high degree of expansion is striven for because, typically, the more the graphite particles are expanded, the stronger the particles tend to interlock upon compression and as a result, stronger and tighter graphite foils can be produced. Thus, a high degree of expansion is generally a prerequisite for the production of graphite foil with a high mechanical strength and low fluid permeability, which can be used, for example, in the production of gaskets and seals.

Contrarily, it has been found that such strong interlocking between the expanded graphite particles is not necessary when the expanded graphite material is not molded into a dense foil, but applied as a packed bed or only slightly compressed into a porous matrix.

Other features, details and advantages will be best understood from the following detailed description including examples.

DETAILED DESCRIPTION

Processes for the production of expanded graphite material are known from, for example, sources such as U.S. Pat. No. 3,404,061. The starting material is flaky natural graphite or synthetic graphite. The graphite flakes of the starting material are treated with a solution of an intercalating agent, e.g., with a mixture of concentrated sulfuric acid and nitric acid, with fuming nitric acid or with a mixture of hydrogen peroxide and concentrated sulfuric acid, resulting in the formation of a graphite salt or a similar graphite intercalation compound. Further intercalation agents are known in the art. U.S. Pat. No. 6,645,456 discloses an intercalation mixture formed of at least one strong concentrated acid selected from the group consisting of sulfuric acid and nitric acid, an oxidizing agent selected from the group consisting of concentrated nitric acid, hydrogen peroxide and peroxo sulfuric acid for oxidizing the graphite, and a thermal polyphosphoric acid.

The graphite-intercalation compounds or graphite salts, for example, graphite hydrogen sulfate or graphite nitrate, are heated in a shock-like manner. Conventionally, the intercalated graphite is expanded by a factor of between 100 and 300. The expansion reduces the bulk density from about 600 to 700 g/l of the intercalation compound to about 2 to 7 g/l of the expanded graphite material. The expanded graphite material consists of very bulky vermiform or concertina-shaped aggregates. These particles have a rugged surface with a lot of small pores. Due to this surface texture, such expanded graphite material usually is not readily wetted and infiltrated by a liquid phase change material (PCM), especially by a hydrophilic phase change material.

In order to obtain an expanded graphite material which is readily wetted by a liquid phase change material, the expansion process that is generally known in the art is modified so that after expansion, the bulk density is reduced to between 5 and 200 g/l. Suitable means to achieve this target are:

1) limitation of the particle size of the starting graphite material to 50 mesh or below;

2) appropriate adjustment of the mass ratio between the starting graphite material and the intercalating agent(s) applied in the intercalation process; and 3) reduction of the temperature of the expansion from 800° C. or above to at most 750° C., preferably 500° C. or below.

It is appreciated that more than one of these means can be combined to achieve a target density.

Figure 1:
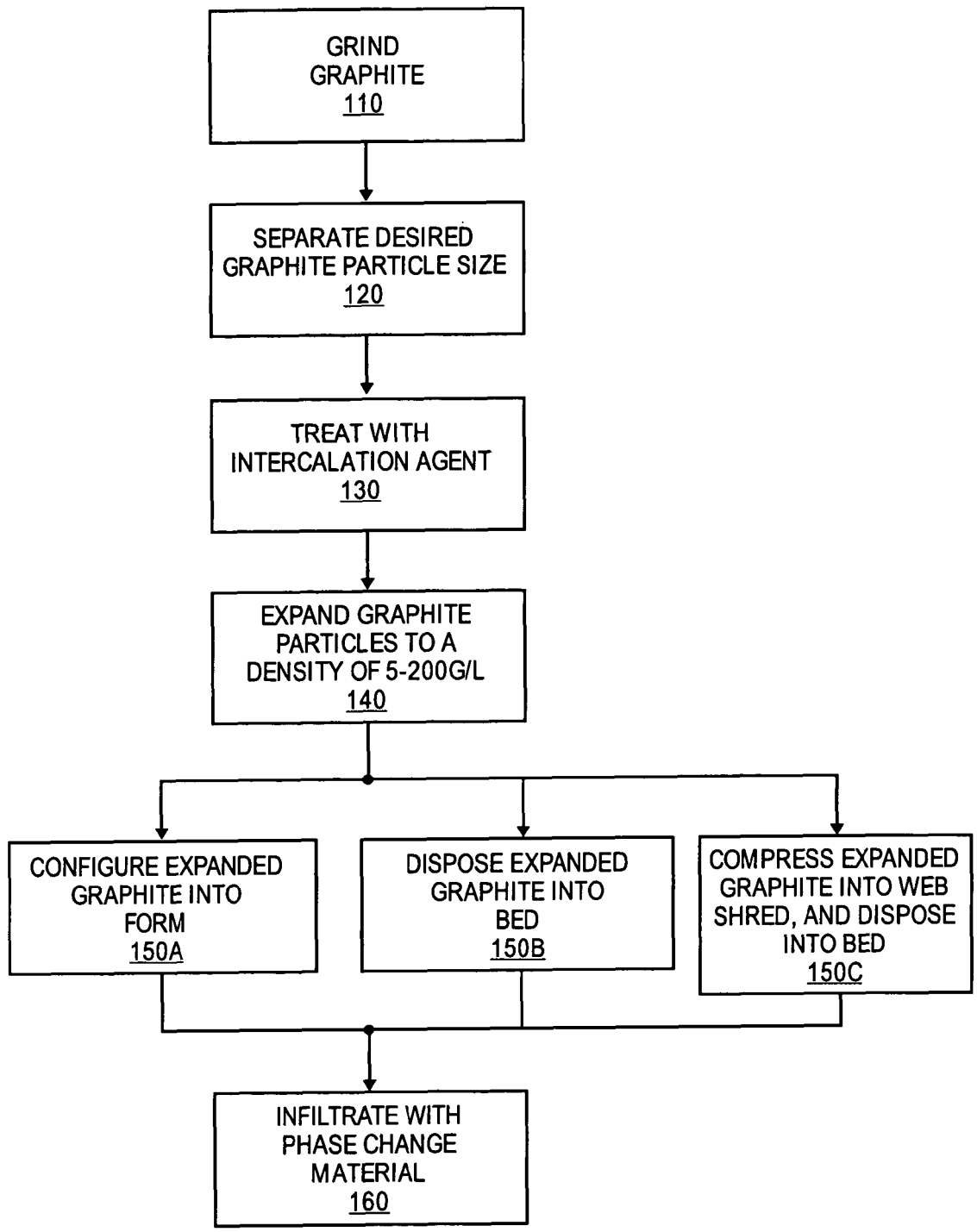
FIG. 1 shows a flow chart of an embodiment of a process for forming a composite of expanded graphite and a phase change material.

FIG. 1 shows a flow chart of an embodiment of a process for forming a composite of expanded graphite material and a phase changer material. In one embodiment, the starting graphite material is raw natural graphite. A representative supplier of natural graphite is Graphit Kropfmühl AG, Hauzenberg, Germany. Typically, the mineral content of natural graphite does not react chemically with a phase change material. Therefore, the purity of natural graphite is not an issue. A suitable ash content of natural graphite is, for example, below five percent by weight. In another embodiment, synthetic graphite or a combination of synthetic and natural graphite may be substituted for the natural graphite.

In one embodiment, the starting graphite material is prepared by grinding raw natural graphite and separation of the fraction with the desired particle size by sieving (block 110). The smaller the particle size of the starting natural graphite, the lower is the degree of expansion. Thence, upon expansion of small graphite particles, expanded particles with a less rugged surface and a lower amount of small pores will be formed, thus minimizing the negative capillary effect which is detrimental to infiltration with a liquid phase change material. In one embodiment, particles of a desired average particle size are selected (block 120). In one embodiment, particles with a particle size of at most 50 mesh are selected as the starting graphite material.

According to one embodiment, the selected particles of the starting graphite material are treated with an intercalation solution containing an oxidation agent (block 130). Any oxidizing agent which is known in the art to be suitable for forming a graphite intercalation compound can be used.

It was found that the degree of expansion is reduced when the mass of intercalation agent applied to a given mass of starting graphite material is reduced compared to the prior art. Thus, the bulk density of the expanded graphite material can be tailored by applying the appropriate amount of intercalation agent for a given amount of starting graphite material. The amount of intercalation added to natural graphite depends on the type of intercalation agent and on the production process. The amount of acid intercalated in the graphite after the graphite salt production process is typically about 10 to 15 percent by weight in current state of the art processes and below 10 percent by weight according to one embodiment of the invention.

For each oxidation agent, the appropriate amount of oxidation agent needed to obtain expanded graphite material with the desired density can be determined by a series of tests of intercalation and subsequent expansion with varying amount of oxidation agent.

The intercalated graphite particles are expanded by thermal shock treatment. While in the prior art a high expansion temperature (between 800° C. and 1000° C.) is preferred in order to reach a high degree of expansion, in one embodiment of the described process, the expansion temperature is kept at 750° C. or below, preferably at 500° C. or below, in order to limit the degree of expansion so that an expanded graphite material with a density between 5 and 200 g/l is obtained (block 140).

By limiting the degree of expansion in such way, an expanded graphite material with a less rugged surface and a lower amount of small pores will be formed which is more easily infiltrated by a liquid phase change material. Therefore, a matrix or packed bed made of graphite expanded at below 750° C., preferably 500° C. or below can take up a larger amount of phase change material than a packed bed or matrix of comparable size and density made of graphite which was expanded at a higher temperature, e.g., 1000° C.

Another means which is helpful in facilitating the infiltration is addition of a certain amount of non-expanded particles of graphite (natural or synthetic) to the expanded graphite material. When a mixture of expanded graphite material and non-expanded graphite particles is applied, the specific advantages of both substances can be exploited.

While the compact particles of the non-expanded graphite facilitate infiltration, the porous and bulky particles of the expanded graphite material build up a continuous network of heat-conducting paths throughout the composite. Furthermore, the bulky particles of expanded graphite material are able to interlock. This allows the mixture of expanded graphite material and non-expanded graphite to be pressed into a coherent matrix body which can be infiltrated by the phase change material. On the other hand, pure natural graphite cannot be pressed into a coherent matrix body, it can be applied only as bulk good because the flaky particles of natural graphite do not interlock.

According to one embodiment, mixtures of expanded graphite material and non-expanded graphite containing up to 70 percent by weight of non-expanded natural graphite can be used for the preparation of the heat storage composite (e.g., 70 percent by weight non-expanded graphite (either natural or synthetic) of the total graphite in the composite and 30 percent by weight expanded graphite material).

In another embodiment, the non-expanded graphite particles may be totally or partially replaced by another auxiliary component or components such as metals, minerals and/or glass with similar or higher thermal conductivity (with respect to natural graphite) that do not react with the selected phase change material.

The expanded graphite material obtained from the expansion process described above and optionally combined with non-expanded particles of graphite and/or other auxiliary component(s) is then configured into a form suitable for infiltration with a phase change material in order to prepare a latent heat storage composite.

According to one embodiment, the expanded graphite material prepared by the expansion process described above and optionally combined with non-expanded natural graphite is shaped into a coherent matrix body (block 150A). This is done by pre-compressing the graphite material to such a degree that sufficient residual porosity is preserved. This is achieved when the expanded graphite material having a bulk density between five and 200 grams per liter (g/l), preferably expanded graphite material having a bulk density between five and 50 g/l is compressed in such a way that the density is increased by a factor of at least six and preferably by a factor between six and 50. Thus, an apparent (geometrical) density of the matrix obtained is between 30 and 1500 g/l, preferably between 75 and 500 g/l. The matrix may have the shape of a plate, a cylindrical body or a cube or any other suitable shape which can be formed by pre-compressing the expanded graphite material. An example of a coherent matrix body is a porous plate of compressed expanded graphite material with representative dimensions on the order of 400×600×10 cubic millimeters (mm$^3$) and a density of 150 g/l.

Following the formation of a coherent matrix body, the matrix body is infiltrated with a phase change material (block 160). Infiltration of the matrix body with a phase change material in the liquid state is facilitated by any suitable technique. For example, the infiltration techniques disclosed in EP 0914399 B1 or U.S. Publication No. 2002-060063 can be applied. Infiltration can be supported by vacuum or pressure. However dip infiltration without vacuum is preferred, for reasons of expenses for the equipment. Due to the improved wettability of the expanded graphite material prepared according to the described technique(s), dip infiltration allows to reach the same degree of infiltration as with vacuum infiltration in the prior art.

According to another embodiment, the expanded graphite material prepared by the expansion process described above and optionally combined with non-expanded material graphite is disposed in a vessel to form a bed (block 150B). The bed is covered with a layer of a phase change material in the liquid state, the liquid phase change material is infiltrated into the bed and solidified (block 160). Infiltration can be supported by vacuum or pressure. However infiltration without vacuum or pressure may be preferred, for reasons of expenses for the equipment. Due to the improved wettability of the expanded graphite material prepared according to the technique(s) described, the same degree of infiltration as with vacuum infiltration in the prior art is possible.

Prior to or after the infiltration, the packing density of the graphite particles may be increased by shaking or tamping. Such treatment also brings about some alignment of the particles, although this effect may be limited due to the bulkiness of the particles.

According to a third embodiment, the expanded graphite particles prepared by the expansion process described above are compressed into a planar foil-like web with a density between, for example, 500 g/l and 1400 g/l, which is than cut (shredded) into pieces having an average diameter between 5 microns (µm) and 20 millimeters (mm), preferably between 50 µm and 5 mm (block 150C). Shredding of the graphite foil can be done in a cutting mill, a jet mill or other suitable mill. Upon compression, the basal planes within the expanded graphite particles are aligned perpendicularly to the direction of compression, resulting in increased thermal conductivity in the direction parallel to the basal planes, compared to the direction perpendicular to the basal planes. This phenomenon is known as anisotropy.

According to this third embodiment, within a vessel, a bed is provided by disposing graphite particles obtained by cutting into pieces of a planar web formed by compression of expanded graphite material prepared by the expansion process described above (block 150C). The bed is covered with a layer of a phase change material in the liquid state, followed by infiltration of the bed with the liquid phase change material, and solidification of the phase change material (block 160). Infiltration can be supported by vacuum or pressure. However infiltration without vacuum or pressure is preferred, for reasons of expenses for the equipment. Due to the improved wettability of the expanded graphite material prepared according to the technique(s) described, the same degree of infiltration as with vacuum infiltration in the prior art can be reached.

Prior to or after the infiltration, alignment and packing density of the graphite particles may be increased by shaking or tamping.

It is appreciated that the second and third embodiments described above may be combined, by forming a bed containing a mixture of expanded graphite particles and particles obtained by cutting into pieces a planar web formed by compression of expanded graphite particles prepared by the expansion process described above, covering the bed with a layer of a phase change material in the liquid state, infiltrating the bed with the liquid phase change material, and solidifying the phase change material. Non-expanded natural graphite can be added to the mixture, too. Infiltration can be supported by vacuum or pressure. Prior to or after the infiltration, alignment and packing density of the graphite particles may be increased by shaking or tamping.

In one embodiment, any phase change material can be utilized that can be transferred into the liquid state. Transfer into the liquid state is achieved by melting the PCM or by dissolving it in a suitable solvent, which is evaporated from the composite after infiltration.

Suitable phase change materials are, for example, paraffins; sugar alcohols; polymers, in particular, thermoplastic polymers; water, organic acids like fatty acids or other organic acids like capric acid, lauric acid, myristic acid, palmitic acid and stearic acid and their mixtures; aqueous solutions of salts, salt hydrates, mixtures of salt hydrates, inorganic and organic salts and eutectic blends of salts, clathrate hydrates and alkali metal hydroxides. Typical examples of polymers suitable as phase change materials are polyethylene, polypropylene, polyamides, polycaronates, polyimides, poly(butadiene), poly(isoprene), poly(hydrogenated butadiene), polyetherester elastomers, ethylene/propylene/diene (EPDM) polystyrene and polyvinyl chloride. Examples of salts and salt hydrates suitable as phase, change materials include ammonium and alkali and alkali earth metal salts like chlorides, chlorates, nitrates, nitrides, sulfides, phosphates, hydroxides, carbonates, fluorides, bromides, acteates, acetamides and perborates of magnesium, sodium, potassium, calcium, lithium, barium and their hydrates. Typical representatives of salts and salt hydrates utilizable as phase change materials are e.g., potassium nitrate, sodium nitrate, lithium nitrate, sodium chloride, calcium chloride, lithium chlorate, and their mixtures or calcium chloride hexahydrate, magnesium chloride hexahydrate, lithium nitrate trihydrate and sodium acetate trihydrate. Representative of sugar alcohols are, for example, pentaerythritol, trimethylolethane, erythritol, mannitol, neopentyl glycol and their mixtures. Representative of hydrophilic phase change materials are, for example, potassium nitrate, sodium nitrate, magnesium chloride, lithium nitrate, magnesium chloride hexahydrate and lithium nitrate trihydrate.

The phase transition temperatures of the phase change materials that are suitable for the latent heat storage material include but are not limited to, those in the range from −100° C. to +500° C. At phase transition temperatures above 500° C., increased care should generally be taken to protect the graphite against oxidative attack from ambient oxygen. As described above, the graphite material or particles are typically infiltrated with a phase change material that is in a liquid state.

Within the framework of these conditions, choice of phase change material (PCM) is made according to the temperature range in which the latent heat storage device is intended to be used.

According to one embodiment, a process for the manufacture of a latent heat storage device is described as follows. A bed formed of the latent heat storage composite obtained according to the invention is transferred into an environmentally isolated container provided with heat exchanger profiles. Within the composite, the expanded graphite particles prepared by the expansion process described above and/or particles obtained by cutting into pieces a planar web formed by compression of expanded graphite particles prepared by the expansion process described above can be aligned in such a bed by tamping or shaking.

In accordance with another embodiment, the latent heat storage composite can also be produced directly in the container by filling it with a bed of expanded graphite material prepared by the expansion process described above and/or particles obtained by cutting into pieces a planar web formed by compression of expanded graphite particles prepared by the expansion process described above. Following filling of the container, aligning the graphite particles by shaking or tamping. Optionally, up to 70% by weight of non-expanded natural graphite can be added to the bed filling the container. The bed of graphite material may then be infiltrated with the phase change material in the liquid state. The infiltration can be supported with pressure or vacuum. However, infiltration without vacuum or pressure may be preferred, for reasons of expenses for the equipment. Due to the improved wettability of the expanded graphite material prepared according to the technique(s) described above, the same degree of infiltration as with vacuum infiltration in the prior art can be reached.

According to another embodiment, a process for the manufacture of a latent heat storage device includes providing a heat storage container having heat exchanger tubes running in a vertical direction and having a space between the tubes, introducing a bed containing particles of expanded graphite material prepared by the expansion process described above and/or particles obtained by cutting into pieces a planar web formed by compression of expanded graphite material prepared by the expansion process described above into the space between the tubes, orienting the graphite particles by shaking or tamping. Optionally, up to 70% by weight of non-expanded natural graphite can be added to the bed filling the container. The graphite bed is covered with a layer of a phase change material (PCM) in the liquid state, and the phase change material infiltrates the graphite bed.

Figure 2:
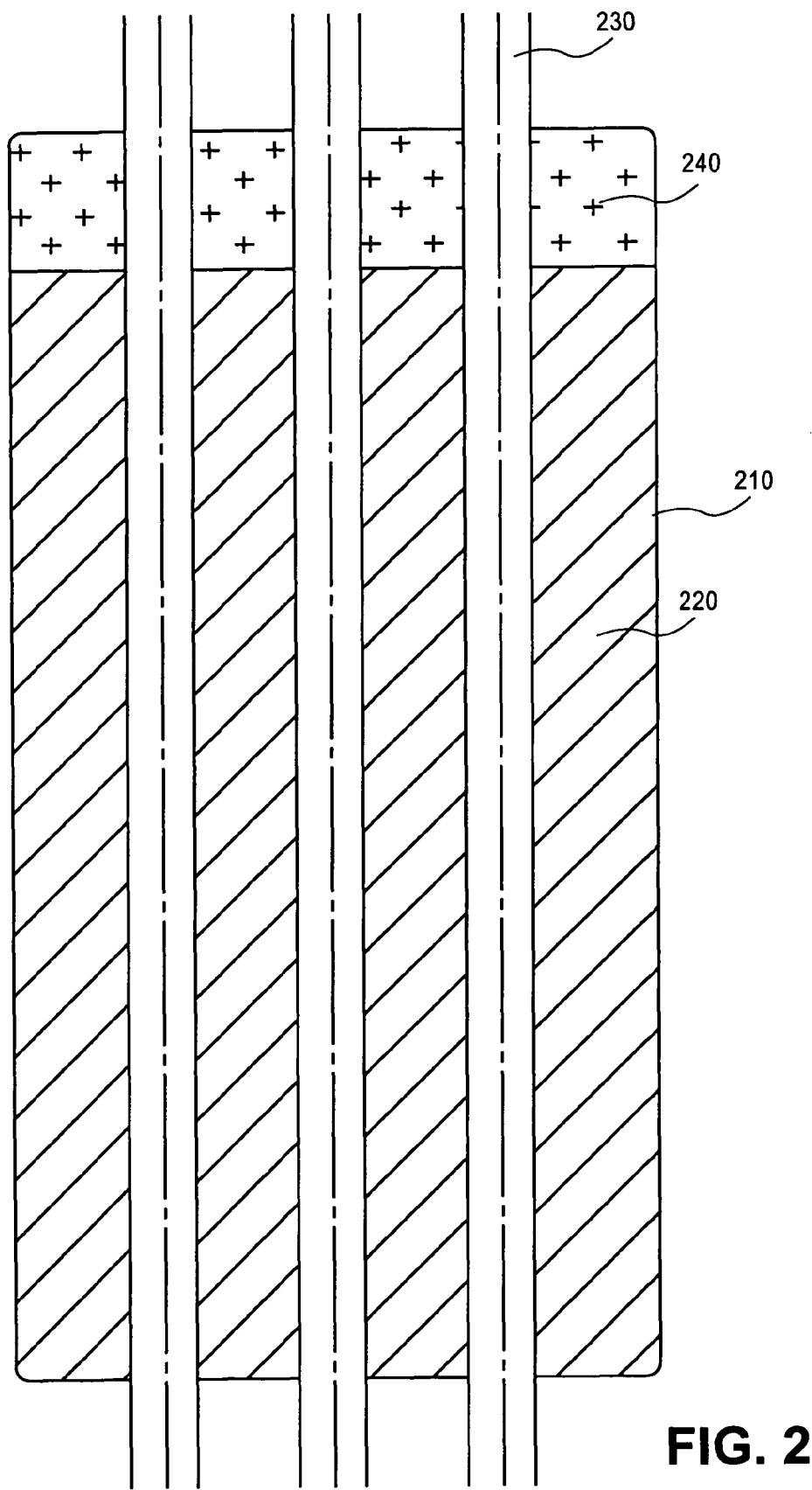
FIG. 2 shows a cross-sectional side view of an embodiment of a latent heat storage device.

FIG. 2 shows an embodiment of a latent heat storage device including container 210, having composite 220 disposed therein of a graphite material infiltrated with a phase change material. FIG. 2 shows heat exchanger tubes 230 extending vertically (as viewed) through container 210. FIG. 2 also shows expansion volume 240 of a volume within container free of graphite material and phase change material. Expansion volume 240 provides a volume within the container for the phase change material to expand.

As a result of the shaking or tamping described above, the graphite particles are oriented mainly perpendicular to the vertically-oriented heat exchanger tubes, i.e., directed away from the tubes, allowing an effective supply of the heat from the heat exchanger tubes into the interior of the heat storage material and an effective removal of the heat from the interior of the heat storage material to the tubes. Such a horizontal configuration in the bed can be achieved more easily with the flake-like particles obtained by cutting into pieces a planar web formed by compression of expanded graphite material than with the bulky particles of expanded graphite material. Therefore, in this embodiment, particles obtained by cutting into pieces a planar web formed by compression of expanded graphite particles prepared by the expansion process described above or graphite mixtures containing such particles or graphite mixtures containing non-expanded natural graphite flakes are preferred.

According to another embodiment, there is provided a process for using the latent heat storage composites in latent heat storage devices for the temperature control and air conditioning of rooms, buildings and motor vehicles, for example for the transport of heat-sensitive goods and for food delivery, for cooling electronic components or for storing heat, in particular solar heat or process heat produced in industrial processes. Prior patent documents describe representative examples of applications of latent heat storage devices for which the latent heat storage devices described according to embodiments of the invention including embodiments of composites of graphite material and phase change material may be substituted. These applications include a chilled ceiling and container disclosed in EP1371915; a method for heating and cooling a room and a building disclosed in WO2003102484; a room temperature air conditioner disclosed in EP1455156; a temperature conditioning apparatus for rooms consisting of two constructional elements of heat storage capacity, cooling element and vertical convector shaft disclosed in DE10036777; devices for cooling electrical and electronic components disclosed in US2005007740; and heat sinks disclosed in US2002033247.

Other features which are considered as characteristic for the invention are set forth in the appended claims.

Although the invention is described herein as embodied in a process for the preparation of latent heat storage composites, a process for the manufacture of latent heat storage devices utilizing the latent heat storage composites and processes for using the latent heat storage composites in latent heat storage devices it is nevertheless not intended to be limited to the details given, since various modifications and structural changes may be made therein without departing from the spirit of the invention and within the scope and range of equivalents of the claims.

EXAMPLE 1

In order to determine the influence of the amount of the intercalation agent on the degree of expansion, a series of intercalation and expansion tests were performed. The mass of the starting graphite material (flakes of natural graphite) was the same in each test, but different amounts of intercalation agent were added to the graphite flakes.

Fumic nitric acid was used as the intercalation agent. The expansion was carried out at 500° C. In a second series of tests, the same amounts of fumic nitric acid were applied, but the expansion was carried out at 800° C.

The applied amount of natural graphite and acid, the expansion temperature and the density of the expanded graphite material are compiled in Table 1.

It can be seen that the density of the expanded graphite material tends to be higher the lower the amount of fumic nitric acid applied to a certain amount of natural graphite and the lower the expansion temperature. A higher density of the expanded graphite material corresponds to a lower degree of expansion, and therefore to a less rugged and porous material, which is more easily infiltrated by a liquid phase change material.

TABLE 1

Influence of the amount of intercalation agent on the density of the expanded graphite material

| parts by weight of natural graphite | parts by weight of fumic nitric acid | Expansion temperature/ [° C.] | density of expanded graphite material/[g/l] |
|---|---|---|---|
| 10 | 1 | 800 | 28 |
| 10 | 2 | 800 | 5 |
| 10 | 4 | 800 | 3 |
| 10 | 1 | 500 | 57 |
| 10 | 2 | 500 | 11 |
| 10 | 4 | 500 | 5 |

EXAMPLE 2

In order to determine the influence of the expansion temperature on the degree of expansion, series of expansion tests at various temperatures were performed. For the expansion tests the sulfuric acid based intercalation compound Sumikon GHS SS3 low ash was used. The expansion was carried out at temperatures between 400° C. and 1000° C. The expansion temperature and the density of the expanded graphite material are compiled in Table 2.

Referring to Table 2, it can be seen that the density of the expanded graphite material tends to be higher the lower the expansion temperature is. A higher density of the expanded graphite material corresponds to a lower degree of expansion, and therefore to a less rugged and porous material, which is more easily infiltrated by a liquid phase change material.

TABLE 2

Influence of the expansion temperature on the density of the expanded graphite material

| Expansion temperature/[° C.] | Density of expanded graphite material/[g/l] |
|---|---|
| 400 | 12 |
| 500 | 8.5 |
| 600 | 6.8 |
| 800 | 4.9 |
| 1000 | 4.2 |

EXAMPLE 3

Different expanded graphite materials were prepared by carrying out the expansion at different temperatures. The first material was obtained by carrying out the expansion at 500° C. For sake of comparison, the other material was obtained by expansion at 800° C.

Each material was shaped into a plate-like porous matrix body (30×30×10 mm$^3$) by application of moderate pressure.

Both matrix bodies had a mass of about one gram/g, a density of about 0.1 g/cm³ and a porosity of 95%.

Each matrix body was infiltrated with a eutectic blend containing 58% by weight of KNO₃ and 42% by weight of NaNO₃. This phase change material melts at 220° C.

The infiltration was carried out in an autoclave. Prior to infiltration each matrix body was heated to 260° C. and covered by pouring the molten phase change material thereupon. The molten phase change material was also heated to 260° C. Infiltration was facilitated by at first evacuating the autoclave for 10 minutes and than applying an overpressure of 10 bar (argon atmosphere) for 10 minutes.

In this way, composites comprising a phase change material and a matrix of expanded graphite material were obtained. Such composites are suitable for storage of latent heat.

After infiltration, weight, density, porosity and the volume fraction of the phase change material of the composites were determined. Results are compiled in Table 3. It can be seen that the uptake of phase change material is higher and the residual porosity after infiltration is lower when the graphite was expanded at 500° C.

TABLE 3

Influence of the expansion temperature on the infiltration with a liquid phase change material

| Temperature of expansion/ [° C.] | Before infiltration | | | After infiltration | | | | |
|---|---|---|---|---|---|---|---|---|
| | mass/ [g] | density/ [g/cm³] | porosity/ [vol %] | mass/ [g] | density/ [g/cm³] | residual porosity/ [vol %] | volume fraction of PCM/ [vol %] | graphite/ [vol %] |
| 500 | 0.9 | 0.1 | 95 | 11.4 | 1.36 | 37 | 58 | 5 |
| 800 | 1.0 | 0.11 | 95 | 6.8 | 1.3 | 40 | 51 | 9 |

The invention claimed is:

1. A process comprising:
   grinding a natural graphite material into natural graphite particles;
   selecting the natural graphite particles having a particle size below 50 mesh;
   adding less than 10% by weight of an intercalating agent to expand the natural graphite particles to form an expanded graphite material comprising a bulk density between 5 and 200 grams/liter (g/l);
   configuring the expanded graphite material into a form; and
   infiltrating the form with a phase change material in a liquid state.

2. The process of claim 1, wherein configuring an expanded graphite material into a form comprises:
   shaping the expanded graphite material into a matrix body.

3. The process of claim 2, wherein the expanded graphite material is shaped into a matrix body by compression.

4. The process of claim 3, wherein up to 70% by weight of non-expanded natural graphite is added to the expanded graphite material.

5. The process of claim 3, wherein the expanded graphite material is compressed to an apparent density between 30 and 1500 g/l.

6. The process of claim 3, wherein infiltrating the form comprises dip infiltrating the matrix body with the phase change material.

7. The process of claim 1, wherein prior to infiltrating, the method comprises transferring the phase change material into a liquid state.

8. The process of claim 1, wherein configuring an expanded graphite material into a form comprises:
   disposing the expanded graphite material in a vessel to form a bed.

9. The process of claim 8, wherein infiltrating comprises:
   covering the expanded graphite material with a layer of phase change material in the liquid state, and
   following the method further comprises solidifying the phase change material.

10. The process of claim 9, wherein up to 70% by weight of non-expanded natural graphite is added to the expanded graphite material.

11. The process of claim 9, wherein prior to or after infiltrating, the packing density of the graphite material in the bed is increased by shaking or tamping.

12. The process of claim 1, wherein prior to configuring the expanded graphite material into a form, the method comprises:
   compressing the expanded graphite material into a web; and
   shredding the web into pieces comprising an average particle size between 5 microns and 20 millimeters.

13. The process of claim 12, wherein configuring an expanded graphite material into a form comprises:
   combining the web pieces with expanded graphite material that has not been compressed and shred into pieces.

14. The process of claim 12, wherein
   disposing the web pieces in a vessel to form a bed;
   covering the bed with a layer of phase change material; and
   the liquid phase change material is infiltrated into the bed and solidified.

15. The process of claim 14, wherein after infiltrating, the method further comprises solidifying the phase change material.

16. The process of claim 12, wherein up to 70% by weight of non-expanded natural graphite is added to the web pieces.

17. The process of claim 14, wherein prior to or after infiltrating, the packing density of the graphite particles in the bed is increased by shaking or tamping.

18. The process of claim 17, wherein up to 70% by weight of non-expanded natural graphite is added to the cut pieces.

19. The process of claim 17, wherein prior to or after infiltrating, the packing density of the graphite particles in the bed is increased by shaking or tamping.

20. The process of claim 1, wherein configuring an expanded graphite material into a form comprises:
   combining expanded graphite material with non-expanded graphite and configuring the combination into the form.

21. The process of claim 1, wherein the phase change material has a phase change transition temperature between ~100° C. and 500° C.

22. The process of claim 1, wherein the phase change material is selected from the group consisting of paraffins, sugar alcohols, mixtures of salt hydrates and thermoplastic polymers.

23. A process for the manufacture of a latent heat storage device comprising:
grinding a natural graphite material into natural graphite particles;
selecting the natural graphite particles having a particle size below 50 mesh;
adding less than 10% by weight of an intercalating agent to expand the natural graphite particles to form an expanded graphite material;
disposing a bed comprising the expanded graphite material into a heat storage container comprising a heat exchanger having heat exchanger tubes and space between the tubes, the bed being disposed in the space between the tubes, the expanded graphite material comprising a bulk density between 5 grams/liter (g/l) and 200 g/l; and
infiltrating the graphite bed with a phase change material.

24. The process of claim 23, wherein the bed comprises a mixture of expanded graphite and non-expanded graphite, the non-expanded graphite being present in an amount up to 70% by weight of the graphite in the bed up to 70% by weight of non-expanded natural graphite is added to the expanded graphite material.

25. The process of claim 23, wherein the phase change material has a phase transition temperature between −100° C. and +500° C.

26. The process of claim 23, wherein the phase change material is selected from the group comprising paraffins, sugar alcohols, thermoplastic polymers, and mixtures of salt hydrates.

27. A process comprising:
grinding a natural graphite material into natural graphite particles;
selecting the graphite particles having a particle size below 50 mesh;
adding less than 10% by weight of an intercalating agent to expand the natural graphite particles to form an expanded graphite material;
compressing the expanded graphite material having a bulk density between five g/l and 200 g/l into a planar web;
shredding the planar web comprising compressed expanded graphite material into pieces having an average diameter between 5/lm and 20 mm;
disposing a bed comprising the web pieces into a heat storage container;
covering the bed with a layer of a phase change material in the liquid state; and
infiltrating the graphite bed with the phase change material.

28. The process of claim 27, wherein the bed comprises up to 70% by weight of non-expanded natural graphite.

29. The process of claim 27, wherein the phase change material has a phase transition temperature between −100° C. and +500° C.

30. The process of claim 27, wherein the phase change material is selected from the group consisting of paraffins, sugar alcohols, thermoplastic polymers, and mixtures of salt hydrates.

31. A process comprising:
grinding a natural graphite material into natural graphite particles;
selecting the natural graphite particles having a particle size below 50 mesh;
thermally shocking the selected natural graphite particles at a temperature of up to 750° C. to form an expanded graphite material comprising a bulk density between 5 and 200 grams/liter (g/l);
configuring the expanded graphite material into a form; and
infiltrating the form with a phase change material in a liquid state.

* * * * *

UNITED STATES PATENT AND TRADEMARK OFFICE
CERTIFICATE OF CORRECTION

| | | |
|---|---|---|
| PATENT NO. | : 8,580,171 B2 | Page 1 of 1 |
| APPLICATION NO. | : 11/388896 | |
| DATED | : November 12, 2013 | |
| INVENTOR(S) | : Christ et al. | |

It is certified that error appears in the above-identified patent and that said Letters Patent is hereby corrected as shown below:

In The Specification
COLUMN 7
    At line 53, please delete "phase, change", and substitute therefore --phase change--.

Signed and Sealed this
Twentieth Day of January, 2015

Michelle K. Lee
*Deputy Director of the United States Patent and Trademark Office*